United States Patent
You et al.

(10) Patent No.: US 9,252,403 B2
(45) Date of Patent: Feb. 2, 2016

(54) RECHARGEABLE BATTERY

(71) Applicant: SAMSUNG SDI CO., LTD., Yongin-si,Gyeonggi-do (KR)

(72) Inventors: Tai-Sun You, Yongin-si (KR); Yong-Sam Kim, Yongin-si (KR); Jang-Hyun Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 352 days.

(21) Appl. No.: 13/869,474

(22) Filed: Apr. 24, 2013

(65) Prior Publication Data

US 2014/0147736 A1    May 29, 2014

(30) Foreign Application Priority Data

Nov. 23, 2012   (KR) ........................ 10-2012-0133992

(51) Int. Cl.
| | |
|---|---|
| *H01M 2/30* | (2006.01) |
| *H01M 2/06* | (2006.01) |
| *H01M 2/02* | (2006.01) |
| *H01M 2/04* | (2006.01) |
| *H01M 2/20* | (2006.01) |
| *H01M 2/26* | (2006.01) |

(52) U.S. Cl.
CPC .............. *H01M 2/06* (2013.01); *H01M 2/0202* (2013.01); *H01M 2/0237* (2013.01); *H01M 2/0473* (2013.01); *H01M 2/206* (2013.01); *H01M 2/263* (2013.01); *H01M 2/30* (2013.01); *H01M 2/305* (2013.01)

(58) Field of Classification Search
None
See application file for complete search history.

(56) References Cited

U.S. PATENT DOCUMENTS

| | | | |
|---|---|---|---|
| 2011/0244309 A1 | 10/2011 | Byun et al. | |
| 2011/0287289 A1 | 11/2011 | Kim | |
| 2012/0040240 A1 | 2/2012 | Kim | |
| 2012/0052341 A1* | 3/2012 | Kim et al. | 429/53 |
| 2013/0280574 A1* | 10/2013 | Kim | 429/120 |

FOREIGN PATENT DOCUMENTS

| | | |
|---|---|---|
| KR | 10-2007-0079981 A | 8/2007 |
| KR | 10-2011-0128083 | 11/2011 |

OTHER PUBLICATIONS

European Search Report in EP 13171009.7-1360, dated Feb. 17, 2014 (You, et al.).

* cited by examiner

*Primary Examiner* — Jonathan Crepeau
(74) *Attorney, Agent, or Firm* — Lee & Morse, P.C.

(57) ABSTRACT

A rechargeable battery may include an electrode assembly that performs a charge and discharge action, a case in which the electrode assembly is inserted, a cap plate coupled to an opening of the case, and an electrode terminal in a terminal hole of the cap plate. The electrode terminal may include a plate terminal outside the cap plate and corresponding to the terminal hole, the plate terminal including a through-hole, a first groove, and a second groove, and a rivet terminal, the rivet terminal passing through the terminal hole, being inserted in the through-hole, and being riveted to the plate terminal at an upper end of the rivet terminal. The first groove may extend from the through-hole at an upper end side of the rivet terminal, and the second groove may extend from the first groove to an outer side of the plate terminal.

20 Claims, 10 Drawing Sheets

RECHARGEABLE BATTERY

CROSS-REFERENCE TO RELATED APPLICATION

The present application claims priority under 35 U.S.C. §119 to Korean Patent Application No. 10-2012-0133992, filed on Nov. 23, 2012, in the Korean Intellectual Property Office, and entitled: "Rechargeable Battery," which is incorporated by reference herein in its entirety.

BACKGROUND

1. Field

Embodiments relate to a rechargeable battery

2. Description of the Related Art

A rechargeable battery is a battery repeatedly performing charge and discharge actions/functions, and is different from a primary battery. A small capacity rechargeable battery may be used, e.g., in a portable and small electronic device, such as a mobile phone, a notebook computer, and a camcorder, and a large capacity rechargeable battery may be used, e.g., as a power source for driving motors of a hybrid car and an electric car.

SUMMARY

Embodiments are directed to a rechargeable battery including an electrode assembly that performs a charge action and a discharge action, a case in which the electrode assembly is inserted, a cap plate coupled to an opening of the case, and an electrode terminal in a terminal hole of the cap plate. The electrode terminal may include a plate terminal outside the cap plate and corresponding to the terminal hole and the plate terminal may include a through-hole, a first groove, and a second groove. The electrode terminal may also include a rivet terminal electrically connected to the electrode assembly, the rivet terminal may pass through the terminal hole, be inserted in the through-hole, and be riveted to the plate terminal at an upper end of the rivet terminal. The first groove may extend from the through-hole at an upper end side of the rivet terminal, and the second groove may extend from the first groove to an outer side of the plate terminal.

The first groove may have a diameter larger than that of the through-hole, and the second groove may be at both sides of the first groove in a width direction of the cap plate.

The upper end side may include an upper surface of the rivet terminal, a bottom of the first groove may form a horizontal surface having a same height as that of the upper surface of the rivet terminal, and a bottom of the second groove may form a horizontal surface having a same height as that of the bottom of the first groove.

A side wall of the first groove may include a vertical surface that is perpendicularly connected to the bottom of the first groove.

A side wall of the second groove may include a vertical surface that is perpendicularly connected to the bottom of the second groove.

A side wall of the first groove may include an inclined surface that is connected to the bottom of the first groove at an obtuse angle.

A side wall of the second groove may include an inclined surface that is connected to the bottom of the second groove at an obtuse angle.

The upper end side may include an upper surface of the rivet terminal, a bottom of the first groove may include a first inclined surface with a height that decreases from the upper surface of the rivet terminal, and a bottom of the second groove may include a second inclined surface with a height that decreased from the bottom of the first groove.

A side wall of the first groove may include a vertical surface that is connected to the bottom of the first groove at an acute angle.

A side wall of the second groove may include a vertical surface with a height that varies along the second groove, and the side wall may be perpendicularly connected to the bottom of the second groove.

The second inclined surface may be inclined in the width direction of the cap plate.

The upper end side may include an upper surface of the rivet terminal, a bottom of the first groove may include a horizontal surface having a same height as that of the upper surface of the rivet terminal, and a bottom of the second groove may include an inclined surface with a height that decreases from the bottom of the first groove.

A side wall of the second groove may include a vertical surface with a height that varies along the second groove, the inclined surface may include a concave bottom, and the side wall may be curvedly connected to the concave bottom.

The inclined surface may have a height that decreases in a shape of a convex curved line in the width direction of the cap plate.

The upper end side of the rivet terminal may have a diameter greater than that of the through-hole.

The first groove may surround the upper end side of the rivet terminal.

Embodiments are also directed to a rechargeable battery including an electrode assembly that performs a charge function and a discharge function, the electrode assembly being inside a case, a cap plate that seals an opening of the case, and an electrode terminal in a terminal hole of the cap plate. The electrode terminal may include a first groove at an upper end of the electrode terminal and a second groove extending from the first groove to an outer side of the electrode terminal.

The electrode terminal may include a plate terminal that includes the first groove and the second groove, and a through-hole that is smaller than the first groove, and a rivet terminal that may include an upper end that is riveted to the through-hole of the plate terminal.

The electrode terminal may include a negative electrode terminal and a positive electrode terminal, each of the negative electrode terminal and the positive electrode terminal may include the plate terminal and the rivet terminal, and an external insulating member may be between the plate terminal of the negative electrode terminal and the cap plate.

A conductive top plate may be between the plate terminal of the positive electrode terminal and the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
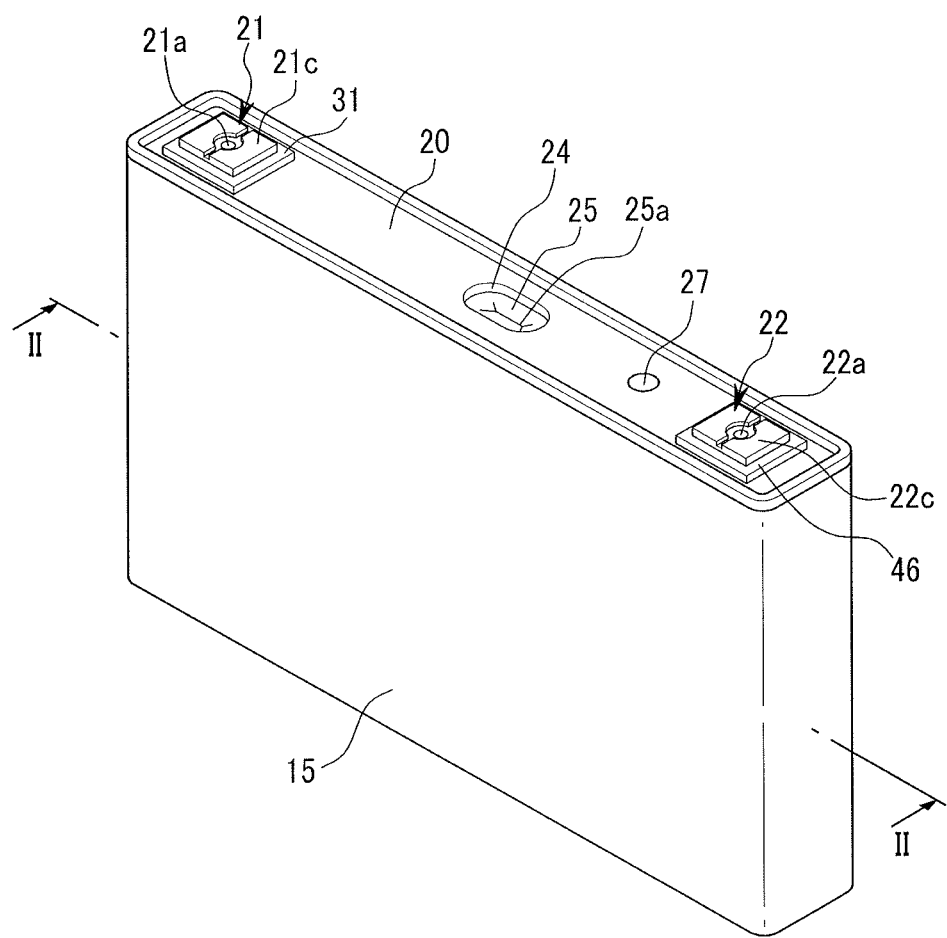
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
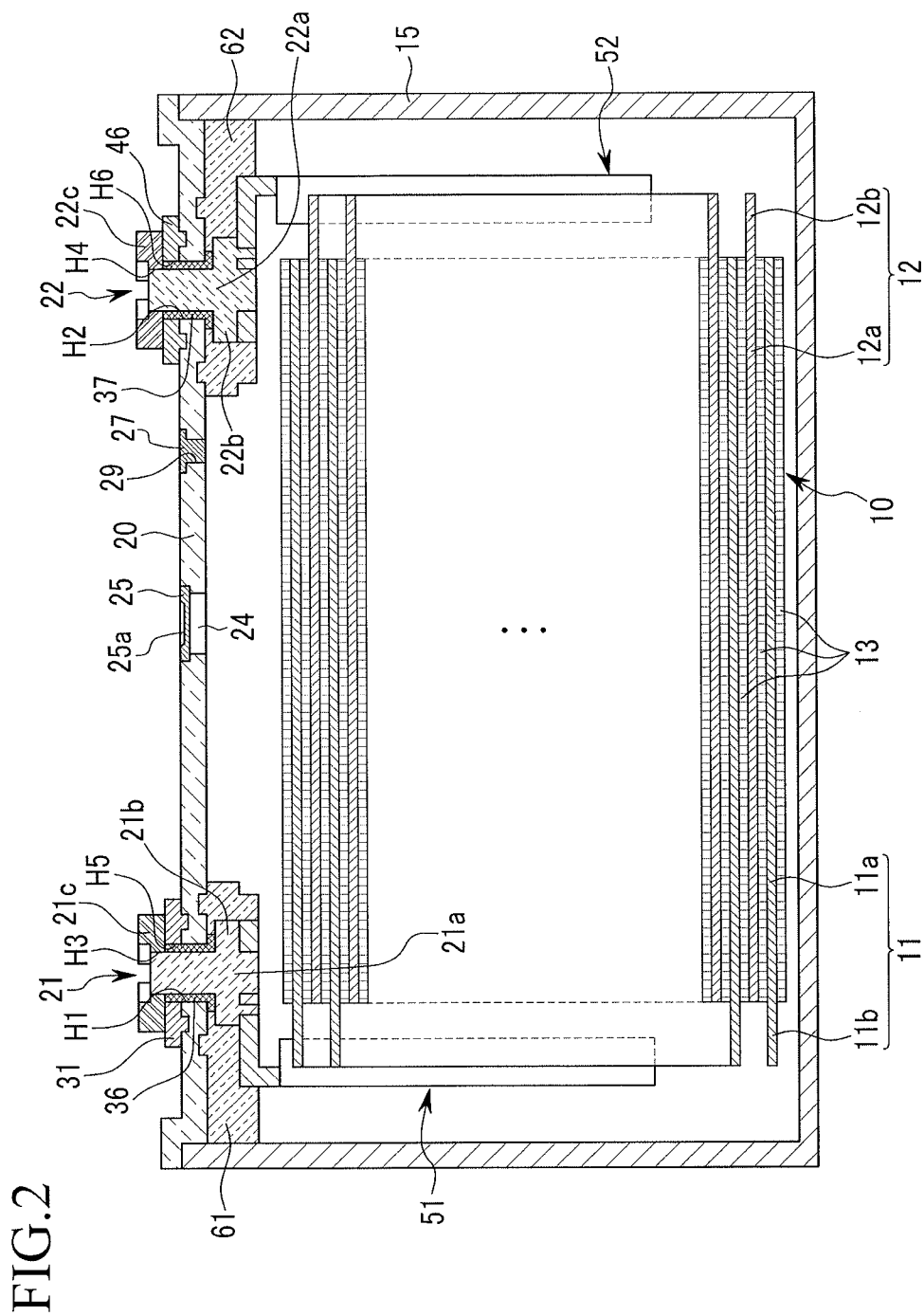
FIG. 2 illustrates a cross-sectional view taken along line II-II of FIG. 1.

FIG. 1 illustrates a perspective view of a rechargeable battery according to a first exemplary embodiment, and FIG. 2 is a cross-sectional view taken along line II-II of FIG. 1.

Referring to FIGS. 1 and 2, the rechargeable battery may include an electrode assembly 10 for charging and discharging current, a case 15 in which the electrode assembly 10 is embedded, a cap plate 20 coupled to an opening of the case 15, and electrode terminals (for example, a negative electrode terminal 21 and an positive electrode terminal 22) installed at the cap plate 20.

For example, the electrode assembly 10 may be formed by disposing a negative electrode 11 and a positive electrode 12 on both surfaces of a separator 13 that is an insulator, and winding the negative electrode 11, the separator 13, and the positive electrode 12 in a jelly-roll state.

The negative electrode 11 and the positive electrode 12 may include coated portions 11a and 12a formed by coating an active material on a current collector of a metal plate, and uncoated portions 11b and 12b formed as a current collector which is exposed because the active material is not coated, respectively.

The uncoated portion 11b of the negative electrode 11 may be formed at one end of the negative electrode 11 along the wound negative electrode 11. The uncoated portion 12b of the positive electrode 12 may be formed at one end of the positive electrode 12 along the wound positive electrode 12. The uncoated portions 11b and 12b may be disposed at both ends of the electrode assembly 10, respectively.

For example, the case 15 may be formed in an approximate cuboid shape so as to set a space for accommodating the electrode assembly 10 and an electrolyte solution therein, and an opening for connecting an outside space to an inside space may be formed at one surface of the cuboid. The opening may permit the electrode assembly 10 to be inserted into the case 15.

The cap plate 20 may be installed at the opening of the case 15 to seal the case 15. For example, the case 15 and the cap plate 20 may be formed of aluminum, and thus the case 15 and the cap plate 20 may be welded to each other.

Further, the cap plate 20 may include an electrolyte injection opening 29, a vent hole 24, and terminal holes H1 and H2. The electrolyte injection opening 29 may permit the electrolyte solution to be injected into the case 15 after the cap plate 20 is coupled to the case 15. After the injection of the electrolyte solution, the electrolyte injection opening 29 may be sealed with a sealing stopper 27.

The vent hole 24 may be sealed with a vent plate 25 so as to discharge internal pressure of the rechargeable battery. When the internal pressure of the rechargeable battery reaches predetermined pressure, the vent plate 25 may be incised (e.g., ruptured) to open the vent hole 24. The vent plate 25 may have a notch 25a for inducing the incision.

The negative electrode terminal 21 and the positive electrode terminal 22 may be installed at the terminal holes H1 and H2 of the cap plate 20, and may be electrically connected to the electrode assembly 10. That is, the negative electrode terminal 21 may be electrically connected to the negative electrode 11 of the electrode assembly 10, and the positive electrode terminal 22 may be electrically connected to the positive electrode 12 of the electrode assembly 10. Accordingly, the electrode assembly 10 may be drawn out to (electrically connected to) the outside of the case 15 through the negative electrode terminal 21 and the positive electrode terminal 22.

The negative electrode terminal 21 and the positive electrode terminal 22 may be formed in the same structure inside the cap plate 20, and thus the same structure will be described together. However, the negative electrode terminal 21 and the positive electrode terminal 22 may be formed in different structures outside the cap plate 20, and thus the different structures will be separately described.

The negative and positive electrode terminals 21 and 22 include plate terminals 21c and 22c disposed outside the cap plate 20 in correspondence with (e.g., to align with) the terminal holes H1 and H2, and rivet terminals 21a and 22a electrically connected to the electrode assembly 10 and fastened (for example, riveted or welded) to the plate terminals 21c and 22c by passing through the terminal holes H1 and H2.

The plate terminals 21c and 22c may have through-holes H3 and H4, and upper ends of the rivet terminals 21a and 22a may be inserted in the through-holes H3 and H4 by passing through the terminal holes H1 and H2. The negative and positive electrode terminals 21 and 22 may further include flanges 21b and 22b widely and integrally formed with the rivet terminals 21a and 22a inside the cap plate 20.

As discussed above, the rivet terminals 21a and 22a may be riveted or welded to the plate terminals 21c and 22c. For example, the upper ends of the rivet terminals 21a and 22a may be riveted to the plate terminals 21c and 22c such that the upper surface of the rivet terminals 21a and 22a may have a diameter greater than the diameter of the respective through-holes H3 and H4.

Negative and positive electrode gaskets 36 and 37 may be installed between the rivet terminals 21a and 22a of the negative and positive electrode terminals 21 and 22 and internal surfaces of the terminal holes H1 and H2 of the cap plate 20, respectively. The negative and positive electrode gaskets 36 and 37 may seal and electrically insulate spaces between the rivet terminals 21a and 22a of the negative and positive electrode terminals 21 and 22 and the cap plate 20, respectively.

The negative and positive electrode gaskets 36 and 37 may further extend between the flanges 21b and 22b and the internal surface of the cap plate 20 to further seal and electrically insulate the spaces between the flanges 21b and 22b and the cap plate 20. That is, the negative and positive electrode gaskets 36 and 37 may substantially prevent the electrolyte solution from leaking through the terminal holes H1 and H2 by installing (sealing) the negative and positive electrode terminals 21 and 22 in the cap plate 20.

Negative and positive electrode lead tabs 51 and 52 may electrically connect the negative and positive electrode terminals 21 and 22 to the negative electrode and the positive electrode 11 and 12 of the electrode assembly 10, respectively. That is, the negative and positive electrode lead tabs 51 and 52 may be connected to lower ends of the rivet terminals 21a and 22a while being supported by the flanges 21b and 22b by coupling the negative and positive electrode lead tabs 51 and 52 to the lower ends of the rivet terminals 21a and 22a and caulking the lower ends.

Negative and positive electrode insulating members 61 and 62 may be installed between the negative and positive electrode lead tabs 51 and 52 and the cap plate 20 to electrically insulate the negative and positive electrode lead tabs 51 and 52 and the cap plate 20. Further, one side of each of the negative and positive electrode insulating members 61 and 62 may be coupled to the cap plate 20, and the other side of each of the negative and positive electrode insulating members 61 and 62 may surround the negative and positive electrode lead tabs 51 and 52, the rivet terminals 21a and 22a, and the flanges 21b and 22b, to stabilize a connection structure thereof.

An external insulating member 31 may be interposed between the plate terminal 21c (at a side of the negative electrode terminal 21) and the cap plate 20 to electrically insulate the plate terminal 21c from the cap plate 20. That is, the cap plate 20 may maintain a state of electrical insulation from the negative electrode terminal 21.

The external insulating member 31 may further include a through-hole H5 corresponding to the terminal hole H1 and the through-hole H3. Accordingly, the rivet terminal 21a may pass through the terminal hole H1 and the through-holes H5 and H3. The negative electrode gasket 36 may be installed by passing through the terminal hole H1 and the through-hole H5.

The external insulating member 31 and the plate terminal 21c may be coupled to the upper end of the rivet terminal 21a and the upper end may be riveted or welded, and thus the external insulating member 31 and the plate terminal 21c may be fastened to the upper end of the rivet terminal 21a. The plate terminal 21c may be installed outside the cap plate 20 in a state where the external insulating member 31 is interposed therebetween.

A conductive top plate 46 may be interposed between the plate terminal 22c (at a side of the positive electrode terminal 22) and the cap plate 20 to electrically connect the plate terminal 22c and the cap plate 20. That is, the cap plate 20 may maintain a state of electrical connection to the positive electrode terminal 22.

The top plate 46 may further includes a through-hole H6 corresponding to the terminal hole H2 and the through-hole H4. Accordingly, the rivet terminal 22a may pass through the terminal hole H2 and the through-holes H6 and H4. The positive electrode gasket 37 may be installed by passing through the terminal hole H2 and the through-hole H6.

The top plate 46 and the plate terminal 22c may be coupled to the upper end of the rivet terminal 22a and the upper end may be riveted or welded, and thus the top plate 46 and the plate terminal 22c may be fastened to the upper end of the rivet terminal 22a. The plate terminal 22c may be installed outside the cap plate 20 in a state where the top plate 46 is interposed therebetween.

In the meantime, the positive electrode gasket 37 may substantially prevent the rivet terminal 22a from being directly and electrically connected with the top plate 46. That is, the rivet terminal 22a may be electrically connected to the top plate 46 through the plate terminal 22c. Accordingly, the top plate 46 and the case 15 may have a bipolar property.

The plate terminals 21c and 22c in the negative and positive electrode terminals 21 and 22 may have the same structure, and thus the plate terminal 21c of the negative electrode terminal 21 will be described as an example for convenience's sake.

Figure 3:
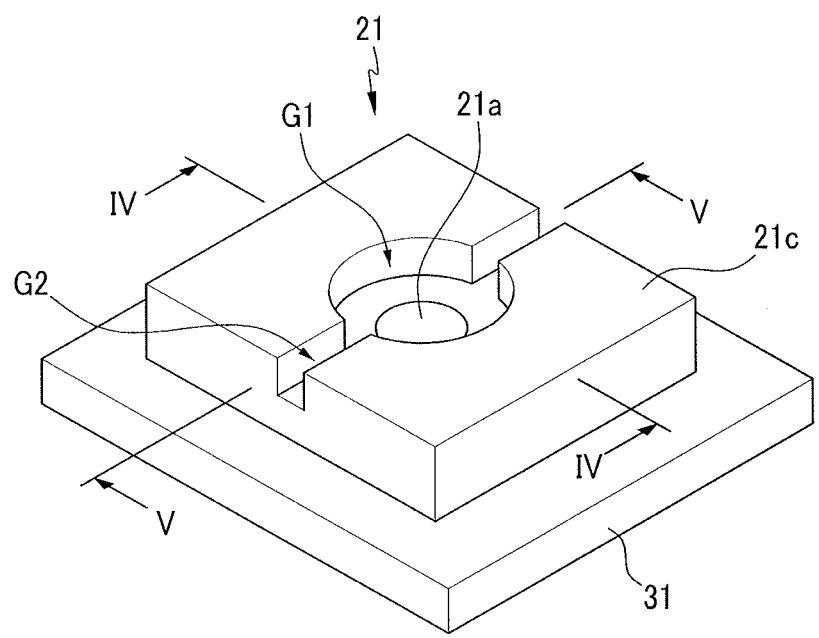
FIG. 3 illustrates a perspective view of an electrode terminal illustrated in FIG. 1.
Figure 4:
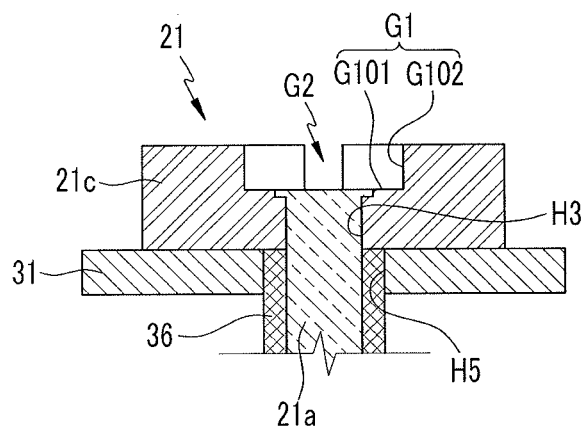
FIG. 4 illustrates a cross-sectional view taken along line IV-IV of FIG. 3.
Figure 5:
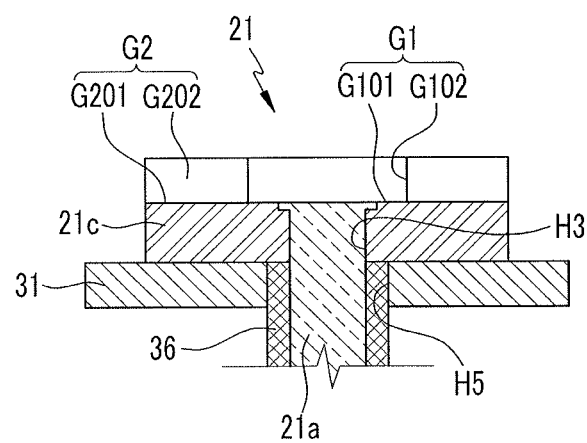
FIG. 5 illustrates a cross-sectional view taken along line V-V of FIG. 3.

FIG. 3 illustrates a perspective view of the electrode terminal illustrated in FIG. 1, FIG. 4 illustrates a cross-sectional view taken along line IV-IV of FIG. 3, and FIG. 5 illustrates a cross-sectional view taken along line V-V of FIG. 3.

Referring to FIGS. 3 to 5, the plate terminal 21c may include a first groove G1 extended from the through-hole H3 at an upper end side of the rivet terminal 21a, and a second groove G2 formed in a direction extending from the first groove G1 to the outside of the plate terminal 21c.

The first groove G1 may be formed at a center of the plate terminal 21c to allow water entering from an upper surface of the plate terminal 21c to be rapidly collected in the first groove G1, and the second groove G2 may discharge the water collected in the first groove G1 to the outside of the plate terminal 21c.

Accordingly, a fastening portion (for example, a riveted portion or a welded portion) of the plate terminal 21c and the rivet terminal 21a may be substantially prevented from being corroded. Water may be generated by a condensation phenomenon around the negative electrode terminal 21.

For example, the first groove G1 may be formed with a diameter larger than that of the through-hole H3, and the second groove G2 may be formed by extending from both sides of the first groove G1 in a width direction (left and right directions in FIG. 5) of the cap plate 20. For example, the first groove G1 may surround the through hole H3 and may have a circular shape. Accordingly, the water collected in the first groove G1 may be rapidly discharged to both sides through the second groove G2.

A bottom G101 of the first groove G1 may form a horizontal surface having the same height (e.g., the same height relative to the cap plate 20) as that of an upper surface of the rivet terminal 21a, and a bottom G201 of the second groove G2 may form a horizontal surface having the same height (e.g., the same height relative to the cap plate 20) as that of the bottom G101 of the first groove G1. For example, the bottom G101 of the first groove G1 and/or the bottom G201 of the second groove G2 may be substantially coplanar and/or parallel to the upper surface of the rivet terminal 21a. Accordingly, the second groove G2 may substantially prevent the water collected in the first groove G1 from being stored in the first groove G1.

A side wall G102 of the first groove G1 may be formed as a vertical surface, and may be perpendicularly connected to the bottom G101 of the first groove G1, e.g., to form the shortest path through which the water may be collected in the first groove G1 from the plate terminal 21c. A side wall G202 of the second groove G2 may also be formed as a vertical surface, and may be perpendicularly connected to the bottom G201 of the second groove G2 to discharge water from the first groove G1 through the perpendicular groove.

Hereinafter, second to fourth exemplary embodiments will be described. The same configuration as that of the first exemplary embodiment will not be repeated, and only the differences from that of the first exemplary embodiment will be described.

Figure 6:
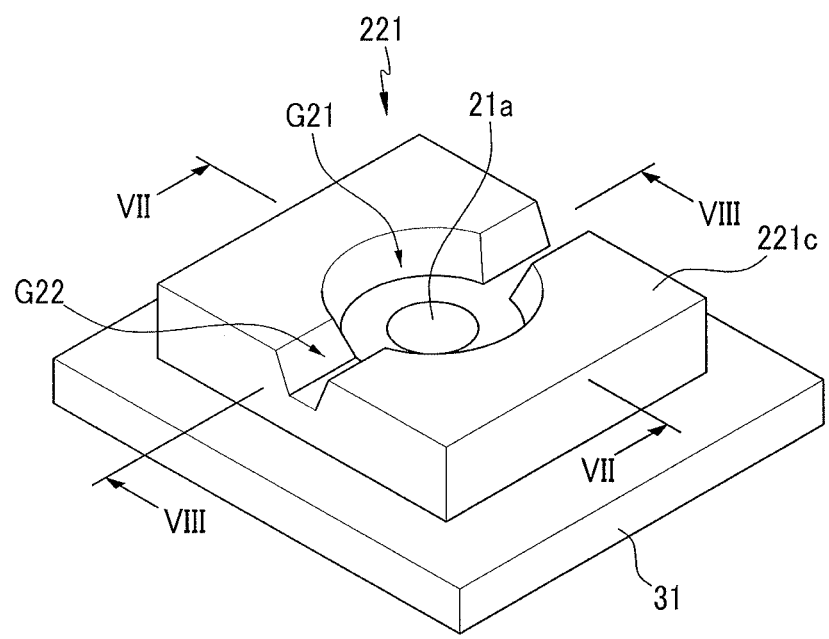
FIG. 6 illustrates a perspective view of an electrode terminal according to a second exemplary embodiment.
Figure 7:
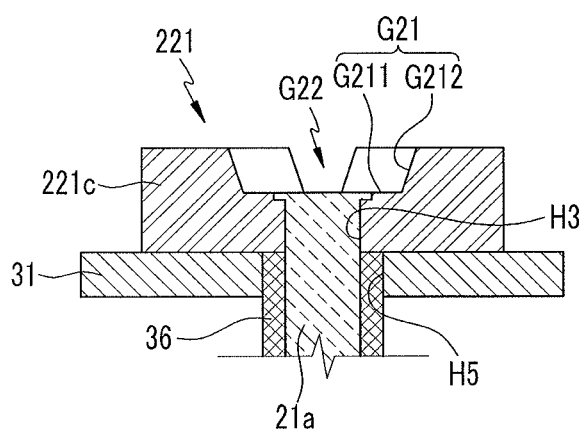
FIG. 7 illustrates a cross-sectional view taken along line VII-VII of FIG. 6.
Figure 8:
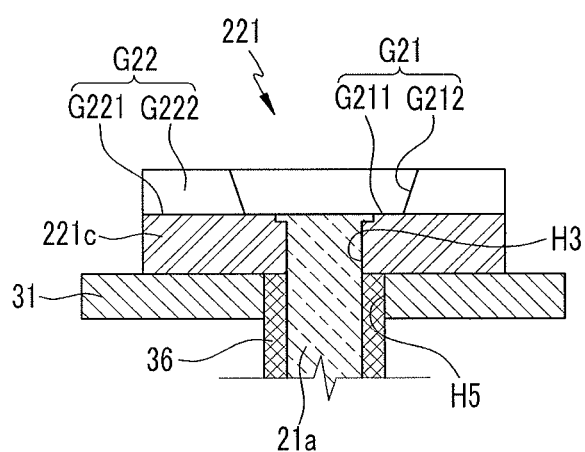
FIG. 8 illustrates a cross-sectional view taken along line VIII-VIII of FIG. 6.

FIG. 6 illustrates a perspective view of an electrode terminal according to the second exemplary embodiment, FIG. 7 illustrates a cross-sectional view taken along line VII-VII of FIG. 6, and FIG. 8 illustrates a cross-sectional view taken along line VIII-VIII of FIG. 6.

Referring to FIGS. 6 to 8, in a plate terminal 221c of a negative electrode terminal 221, a side wall G212 of a first groove G21 may be formed as an inclined surface and may be connected to a bottom G211 of the first groove G21 at an obtuse angle to effectively induce water to move from the plate terminal 221c to the first groove G21. A side wall G222 of a second groove G22 may be formed as an inclined surface and may be connected to a bottom G221 of the second groove G22 at an obtuse angle to discharge water from the first groove G21 through an obtuse groove.

Figure 9:
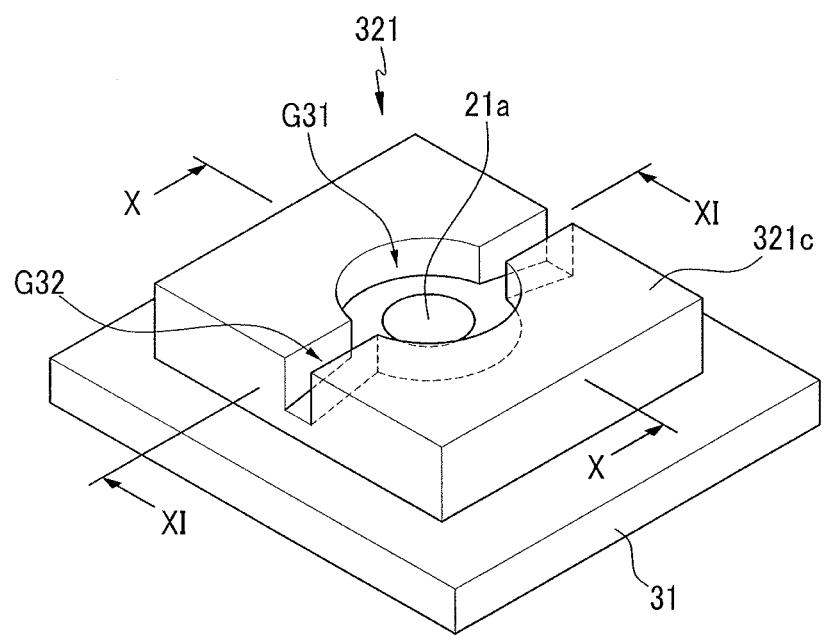
FIG. 9 illustrates a perspective view of an electrode terminal according to a third exemplary embodiment.
Figure 10:
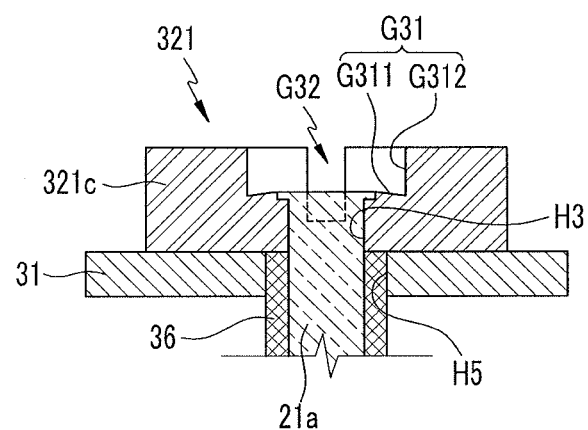
FIG. 10 illustrates a cross-sectional view taken along line X-X of FIG. 9.
Figure 11:
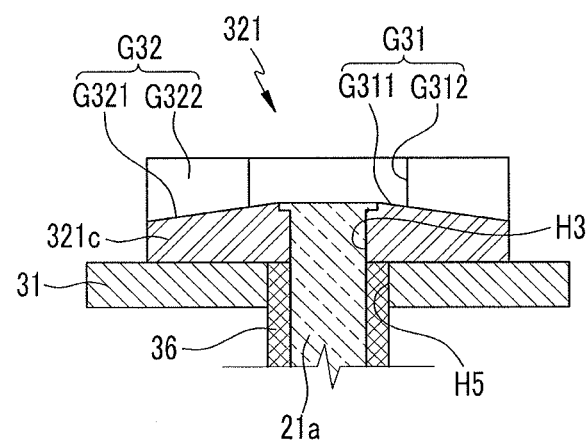
FIG. 11 illustrates a cross-sectional view taken along line XI-XI of FIG. 9.

FIG. 9 illustrates a perspective view of an electrode terminal according to a third exemplary embodiment, FIG. 10 illustrates a cross-sectional view taken along line X-X of FIG. 9, and FIG. 11 illustrates a cross-sectional view taken along line XI-XI of FIG. 9.

Referring to FIGS. 9 to 11, in a plate terminal 321c of a negative electrode terminal 321, a bottom G311 of a first groove G31 may form a first inclined surface of which a height decreases from an upper surface of the rivet terminal 21a (e.g., decreases from the upper surface of the rivet terminal towards the second groove G32), and a bottom G321 of a second groove G32 may form a second inclined surface of which a height decreases from the bottom G311 of the first groove G31 (e.g., decreases from the bottom G311 of the first groove G31 towards the outer side of the plate terminal 321c). For example, the bottom G311 of the first groove G31 and the bottom G321 of the second groove G32 may have the same inclination (e.g., the same slope).

A side wall G312 of the first groove G31 may be formed as a vertical surface, and may be connected to the bottom G311 of the first groove G31 at an acute angle to induce water from an upper end of the rivet terminal 21a to an outer side of the bottom G311.

A side wall G322 of the second groove G32 may be formed as a vertical surface having a height difference and may be perpendicularly connected to the bottom G321 of the second groove G32 (see FIG. 9) to discharge water from the first groove G31 through an acute groove.

Further, the bottom G321 of the second groove G32 may be formed as an inclined flat surface in a width direction (left and right directions of FIG. 11) of the cap plate 20. Accordingly, the water collected in the first groove G31 may be rapidly discharged through the inclined bottom G321 of the second groove G32.

Figure 12:
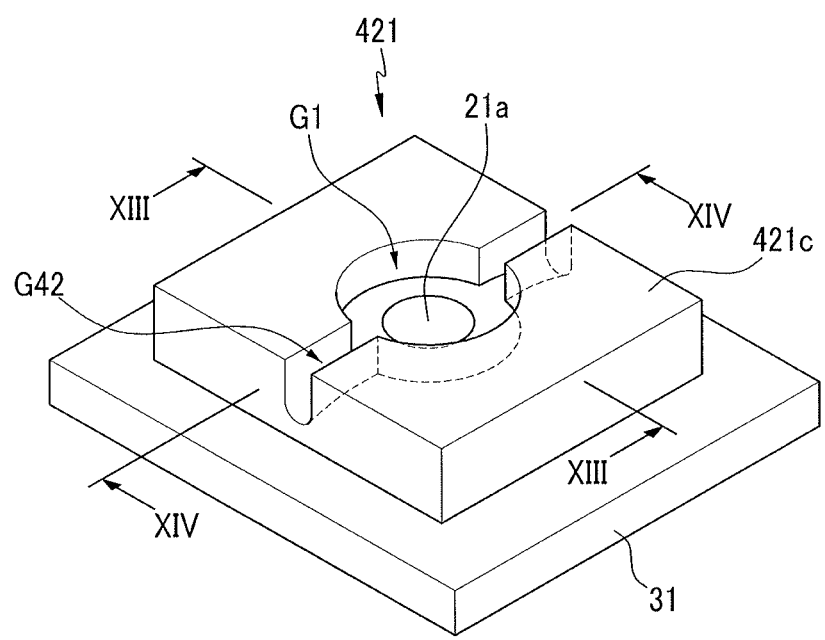
FIG. 12 illustrates a perspective view of an electrode terminal according to a fourth exemplary embodiment.
Figure 13:
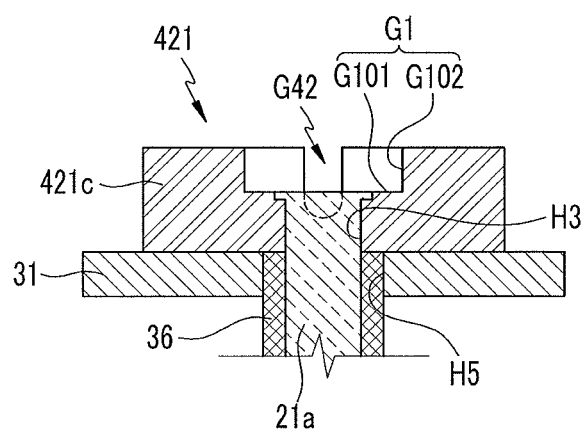
FIG. 13 illustrates a cross-sectional view taken along line XIII-XIII of FIG. 12.
Figure 14:
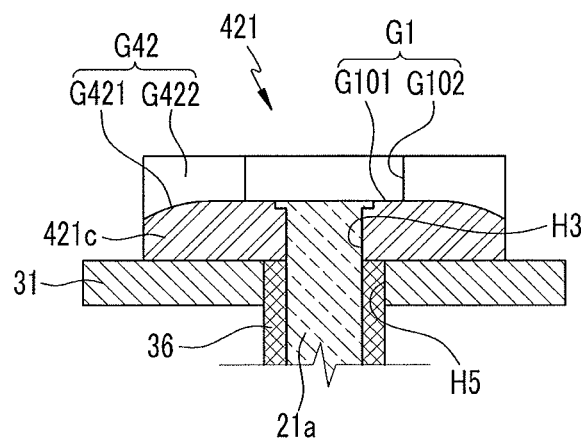
FIG. 14 illustrates a cross-sectional view taken along line XIV-XIV of FIG. 12.

FIG. 12 illustrates a perspective view of an electrode terminal according to a fourth exemplary embodiment, FIG. 13 illustrates a cross-sectional view taken along line XIII-XIII of FIG. 12, and FIG. 14 illustrates a cross-sectional view taken along line XIV-XIV of FIG. 12.

Referring to FIGS. 12 to 14, in a plate terminal 421c of a negative electrode terminal 421, the bottom G101 of the first groove G1 may form a horizontal surface having the same height as that of the upper surface of the rivet terminal 21a, and a bottom G421 of a second groove G42 may form an inclined surface of which a height further decreases from the bottom G101 of the first groove G1 (e.g., decreases from the bottom G101 of the first groove G1 towards the outer side of the plate terminal 421c).

A side wall G422 of the second groove G42 may be formed as a vertical surface having a height difference and may be curvedly connected to the concave bottom G421 of the second groove G42 (see FIG. 12) to discharge water from the first groove G1 through a curved groove.

Further, the bottom G421 of the second groove G42 may be formed as an inclined surface of which a height decreases in a shape of a convex curved line in the width direction (left and right directions of FIG. 14) of the cap plate 20. For example, a cross-section of the bottom G421 of the second groove G42 that is transverse to the second groove G42 (e.g., as illustrated in FIG. 13) may be concave up, and a cross-section of the bottom G421 of the second groove G42 along the second groove G42 (e.g., as illustrated in FIG. 14) may be convex down. Accordingly, the water collected in the first groove G1 may be discharged through the inclined bottom 421 of the second groove G42, and may be more rapidly discharged at an outer side of the second groove G42 compared to a center of the second groove G42 to facilitate a discharge of water from the center side.

By way of summary and review, a rechargeable battery may include an electrode assembly including electrodes at both surfaces of a separator, a case for accommodating the electrode assembly, and a cap plate coupled to an opening of the case, and an electrode terminal installed in the cap plate to be connected to the electrode through a lead tab. For example, the electrode terminal may be a rivet terminal positioned in an inner side a terminal hole in the cap plate, and may be electrically connected to the lead tab. A plate terminal may be included outside the cap plate to be connected to the rivet terminal. The rivet terminal may be inserted in a fastening hole formed in the plate terminal and may be riveted at an upper end. When a module is configured, the plate terminal may be connected to a bus bar by welding. In this case, to allow for a stable welding structure of the plate terminal and the bus bar, an upper end of the rivet terminal may be positioned inside the fastening hole.

After the riveting, a concave groove may be formed by a height difference between the upper end of the rivet terminal and an upper surface of the plate terminal. In this case, water generated due to a condensation phenomenon may stagnate at the groove in the upper surface of the plate terminal. Accordingly, a riveted portion of the rivet terminal and the plate terminal may be corroded.

A rechargeable battery according to the embodiments may allow for the above-mentioned issues to be avoided. In particular, the embodiments may allow for a rechargeable battery to have advantages in terms of preventing corrosion of a fastening portion. For example, the first and second grooves in the embodiments may allow water to be efficiently removed from the rivet terminal and the plate terminal, and thus water that would otherwise enter and stagnate in the first groove and/or the second groove may be discharged. Accordingly, a fastening portion (e.g., a riveted portion and/or a welded portion) in the electrode terminal may be substantially prevented from being corroded, thereby improving safety of the electrode terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly that performs a charge action and a discharge action;
   a case in which the electrode assembly is inserted;
   a cap plate coupled to an opening of the case; and
   an electrode terminal in a terminal hole of the cap plate, the electrode terminal including:
   a plate terminal outside the cap plate and corresponding to the terminal hole, the plate terminal including a through-hole, a first groove, and a second groove, and
   a rivet terminal electrically connected to the electrode assembly, the rivet terminal passing through the terminal hole, being inserted in the through-hole, and being riveted to the plate terminal at an upper end of the rivet terminal,
   wherein:
   the first groove extends from the through-hole at an upper end side of the rivet terminal, and
   the second groove extends from the first groove to an outer side of the plate terminal,
   wherein the first and second grooves allow water to be removed from the electrode terminal.

2. The rechargeable battery as claimed in claim 1, wherein:
   the first groove has a diameter larger than that of the through-hole, and
   the second groove is at both sides of the first groove in a width direction of the cap plate.

3. The rechargeable battery as claimed in claim 2, wherein:
   the upper end side includes an upper surface of the rivet terminal,
   a bottom of the first groove forms a horizontal surface having a same height as that of the upper surface of the rivet terminal, and
   a bottom of the second groove forms a horizontal surface having a same height as that of the bottom of the first groove.

4. The rechargeable battery as claimed in claim 3, wherein a side wall of the first groove includes a vertical surface that is perpendicularly connected to the bottom of the first groove.

5. The rechargeable battery as claimed in claim 3, wherein a side wall of the second groove includes a vertical surface that is perpendicularly connected to the bottom of the second groove.

6. The rechargeable battery as claimed in claim 3, wherein a side wall of the first groove includes an inclined surface that is connected to the bottom of the first groove at an obtuse angle.

7. The rechargeable battery as claimed in claim 3, wherein a side wall of the second groove includes an inclined surface that is connected to the bottom of the second groove at an obtuse angle.

8. The rechargeable battery as claimed in claim 2, wherein:
   the upper end side includes an upper surface of the rivet terminal,
   a bottom of the first groove includes a first inclined surface with a height that decreases from the upper surface of the rivet terminal, and
   a bottom of the second groove includes a second inclined surface with a height that decreased from the bottom of the first groove.

9. The rechargeable battery as claimed in claim 8, wherein a side wall of the first groove includes a vertical surface that is connected to the bottom of the first groove at an acute angle.

10. The rechargeable battery as claimed in claim 8, wherein:
    a side wall of the second groove includes a vertical surface with a height that varies along the second groove, and
    the side wall is perpendicularly connected to the bottom of the second groove.

11. The rechargeable battery as claimed in claim 8, wherein the second inclined surface is inclined in the width direction of the cap plate.

12. The rechargeable battery as claimed in claim 2, wherein:
    the upper end side includes an upper surface of the rivet terminal,
    a bottom of the first groove includes a horizontal surface having a same height as that of the upper surface of the rivet terminal, and
    a bottom of the second groove includes an inclined surface with a height that decreases from the bottom of the first groove.

13. The rechargeable battery as claimed in claim 12, wherein:
    a side wall of the second groove includes a vertical surface with a height that varies along the second groove,
    the inclined surface includes a concave bottom, and
    the side wall is curvedly connected to the concave bottom.

14. The rechargeable battery as claimed in claim 12, wherein the inclined surface has a height that decreases in a shape of a convex curved line in the width direction of the cap plate.

15. The rechargeable battery as claimed in claim 1, wherein the upper end side of the rivet terminal has a diameter greater than that of the through-hole.

16. The rechargeable battery as claimed in claim 1, wherein the first groove surrounds the upper end side of the rivet terminal.

17. A rechargeable battery, comprising:
    an electrode assembly that performs a charge function and a discharge function, the electrode assembly being inside a case;
    a cap plate that seals an opening of the case; and
    an electrode terminal in a terminal hole of the cap plate, the electrode terminal including a plate terminal, the plate terminal including:
    a through-hole;
    a first groove at an upper end of the electrode terminal; and
    a second groove extending from the first groove to an outer side of the electrode terminal, wherein the first and second grooves allow water to be removed from the electrode terminal.

18. The rechargeable battery as claimed in claim 17, wherein
    the through-hole is smaller than the first groove, and
    the electrode terminal further includes a rivet terminal that includes an upper end that is riveted to the through-hole of the plate terminal.

19. The rechargeable battery as claimed in claim 18, wherein:
    the electrode terminal includes a negative electrode terminal and a positive electrode terminal, each of the negative electrode terminal and the positive electrode terminal includes the plate terminal and the rivet terminal, and an external insulating member is between the plate terminal of the negative electrode terminal and the cap plate.

20. The rechargeable battery as claimed in claim 19, wherein a conductive top plate is between the plate terminal of the positive electrode terminal and the cap plate.

* * * * *